United States Patent [19]

Takano et al.

[11] 4,366,515
[45] Dec. 28, 1982

[54] AUTOMATIC HEAD HEIGHT CONTROL APPARATUS

[75] Inventors: Masayuki Takano; Sadao Hosoi; Yuichi Matsushita, all of Atsugi, Japan

[73] Assignee: Sony Corporation, Tokyo, Japan

[21] Appl. No.: 130,168

[22] Filed: Mar. 13, 1980

[30] Foreign Application Priority Data

Mar. 15, 1979 [JP] Japan .................................. 54-30425
Mar. 26, 1979 [JP] Japan .................................. 54-35334

[51] Int. Cl.³ .......................... G11B 21/10; G11B 5/56
[52] U.S. Cl. ........................................ 360/77; 360/109
[58] Field of Search .................... 360/77, 78, 70, 76, 360/107, 108, 109; 235/449, 450

[56] References Cited

U.S. PATENT DOCUMENTS

| | | | |
|---|---|---|---|
| 4,099,211 | 7/1978 | Hathaway | 360/107 |
| 4,106,065 | 8/1978 | Ravizza | 360/109 |
| 4,165,523 | 8/1979 | Hathaway | 360/107 |
| 4,167,762 | 9/1979 | Hashizaki | 360/77 |
| 4,197,564 | 4/1980 | Ravizza | 360/77 |
| 4,203,140 | 5/1980 | Watanabe | 360/77 |
| 4,207,601 | 6/1980 | Desai | 360/78 |
| 4,233,637 | 11/1980 | Kubota | 360/77 |
| 4,255,771 | 3/1981 | Kubota | 360/70 |

Primary Examiner—Robert M. Kilgore
Attorney, Agent, or Firm—Alvin Sinderbrand; Lewis H. Eslinger

[57] ABSTRACT

In a video tape recorder which employs a rotary magnetic head secured on a deflectable device, such as a bi-morph leaf, to dynamically perform head tracking during reproduction of previously recorded tracks regardless of the tape transport speed; the height of the magnetic head is detected during recording to produce a feedback control signal which electrically adjusts the height of the magnetic head by deforming the bi-morph leaf to overcome hysteresis deflection of the bi-morph leaf so that the magnetic head is returned to and maintained at a normal height during recording.

13 Claims, 28 Drawing Figures

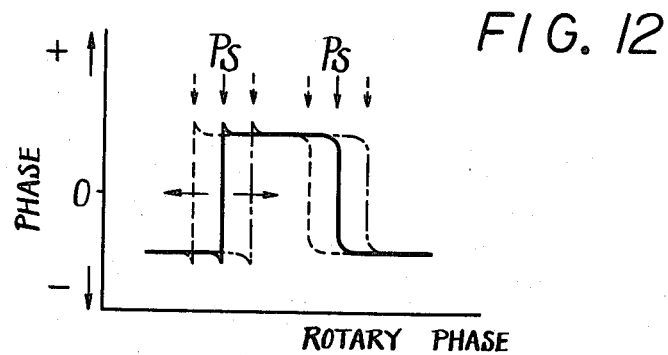
FIG. 12
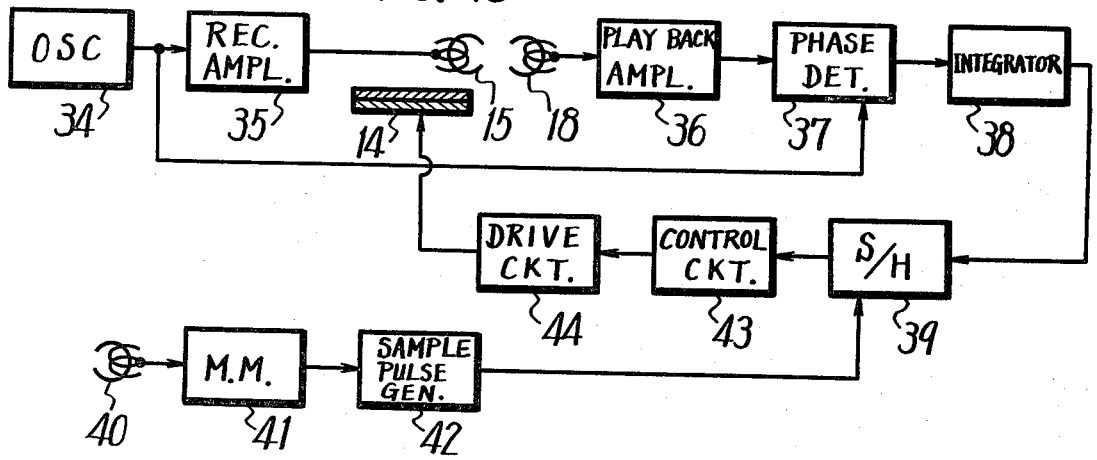
FIG. 13
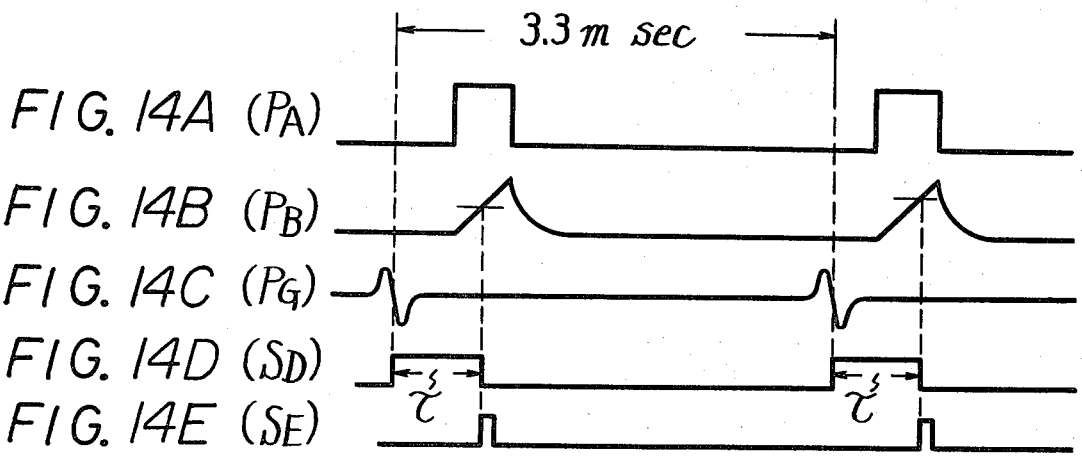
FIG. 14A ($P_A$)
FIG. 14B ($P_B$)
FIG. 14C ($P_G$)
FIG. 14D ($S_D$)
FIG. 14E ($S_E$)

AUTOMATIC HEAD HEIGHT CONTROL APPARATUS

BACKGROUND OF THE INVENTION

This invention relates generally to an automatic control system for a dynamically deflectable head in a video tape recorder, and is particularly directed to an automatic control system for adjusting the head height during recording of signals by means of such a video tape recorder.

Helical scan video tape recorders are required to reproduce recorded video signals in non-standard modes, such as, still, slow, reverse, and fast motion modes, in addition to the normal playback mode. Such non-standard modes are established by changing the tape transport speed and/or direction. When the tape transport speed during reproduction is the same as that during recording, the slant angle at which the reproducing heads scan the tape is equal to the slant angle of the previously recorded tracks.

The same is not true when the tape transport speed or direction used during reproduction differs from the speed or direction, respectively, used for recording. Instead, due to the tape transport speeds or directions at recording and reproduction being different, the path of the head used for reproducing deviates angularly from the recorded tracks. In order to avoid scanning by the reproducing head of two or more recorded tracks, and the generation of guard-band noise, and the like, so-called dynamic tracking is employed in which the reproducing head is mounted on an electrically deflectable element, such as a bi-morph leaf, to which a properly timed and shaped electrical signal is applied during each scan. In response to such electrical signal, the bi-morph leaf deflects and maintains the path of the reproducing head along a selected track during the scan.

However, a bi-morph leaf is subject to hysteresis, that is, once it is electrically deflected by an electrical signal, mere removal of the electrical signal may not cause the bi-morph leaf to return to its original condition. Instead, a residual deflection or distortion may remain in the bi-morph leaf. This residual distortion can be relatively large when the preceding electrical deflection has been large, as may be required for dynamic tracking during fast, slow and still reproduction.

If the head mounted on a bi-morph leaf which retains a residual deflection or distortion is used for recording, the recorded tracks produced by such head are located at different positions from the normal tracks, and the pitch of the recorded tracks may be non-uniform.

As a consequence, the prior art has employed separate heads for reproduction and recording with only the reproducing head being mounted on a bi-morph leaf for dynamic tracking, and with the recording head being fixed. Such provision of separate heads for recording and reproducing increases the cost of a VTR.

OBJECTS AND SUMMARY OF THE INVENTION

Accordingly, it is an object of the present invention to provide an automatic head height control system effective to automatically adjust the height of a magnetic head.

It is another object of the invention to provide a head height control system operative to set at a predetermined value or position the height of a rotary magnetic head mounted on a bi-morph leaf.

It is a further object of the invention to provide a helical scan VTR in which a rotary magnetic head mounted on a bi-morph leaf is used for both reproducing and recording by setting the head height at a predetermined value during recording.

According to an aspect of the invention, a head height control apparatus for at least one magnetic head mounted on an electrically deflectable element comprises sensing means for sensing the magnetic head and producing a detected signal which contains information about a magnitude and a direction of departure of the magnetic head from a predetermined height, and control means responsive to the detected signal for electrically deflecting the electrically deflectable element in a direction and in an amount tending to displace the magnetic head to the predetermined height. In a practical embodiment of the invention, a detecting head is secured at a fixed height facing a magnetic recording and reproducing head which is mounted by way of a bi-morph leaf on a rotating drum of a VTR so that the detecting head can electrically detect the height of the recording and reproducing head on the bi-morph leaf by sensing the leakage magnetic flux from the recording and reproducing head as the latter moves past the detecting head. An error signal generating circuit generates an error signal in response to the phase and/or amplitude of the signal from the detecting head. The error signal is applied to the bi-morph leaf and tends to deflect or deform it in a manner which displaces the recording and reproducing head to a predetermined height.

The head height adjustment according to the present invention is especially useful before and/or during recording operation of the VTR. It may be used with a single-head or 2-head type of VTR. When used with a 2-head VTR, the height of the inactive head may be sensed and corrected when it is out of contact with the tape.

The above, and other objects, features and advantages of the present invention, will become apparent from the following description read in conjunction with the accompanying drawings, in which like reference numerals designate the same elements.

BRIEF DESCRIPTION OF THE DRAWINGS

FIG. 12 is a graph showing the relationship between the phase of the outputs and the rotary phase of the signal magnetic head in FIGS. 8A–8C and for several heights of the signal magnetic head;

FIG. 13 is a block diagram of still another embodiment of the invention which employs the relationships of FIG. 12 for detecting head height;

FIGS. 14A–14E are waveform diagrams to which reference will be made in explaining the operation of the apparatus of FIG. 13;

DETAILED DESCRIPTION OF THE PREFERRED EMBODIMENTS

Before describing the present invention, a brief description of relevant portions of a VTR is provided below as background for understanding the invention.

Figure 1:
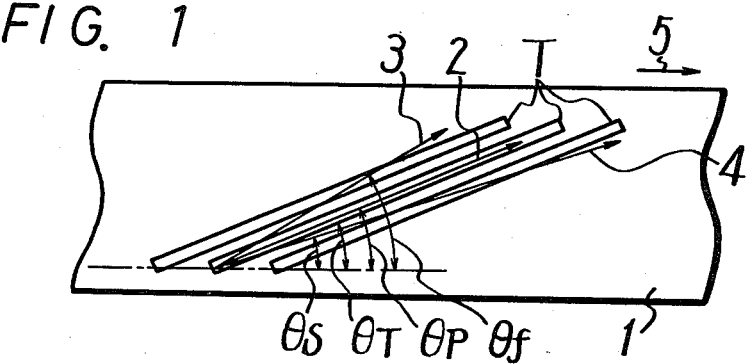
FIG. 1 shows a length of magnetic video tape having depicted thereon a plurality of skewed parallel recorded tracks and the scanning loci of a head during reproduction at normal and non-normal tape transport speeds.

Referring to FIG. 1, it will be seen that, during reproduction with a tape being moved at the normal tape transport speed $V_T$ in the direction of an arrow 5, a slant angle $\theta_P$ of a scanning locus 2 of a magnetic head across tape 1 is equal to a slant angle $\theta_T$ of a recorded track T which was recorded on the tape at the same tape transport speed.

When the tape transport speed is changed from normal transport speed $V_T$ to a higher or lower tape transport speed, the scanning locus and the recorded track T no longer coincide. If the tape transport speed for reproducing is higher than the normal tape transport speed $V_T$, the scanning locus of the reproducing head on tape 1 is slanted at an angle $\theta_f$ as shown by an arrow 3. If the tape speed is lower than the normal tape transport speed $V_T$, the scanning locus is slanted at an angle $\theta_S$ as shown by an arrow 4. The inclination or slant angles $\theta_S$ and $\theta_f$ are different from the inclination angle $\theta_T$ of recorded track T.

The reproducing head thus scans over a plurality of recorded tracks T and the reproduced picture becomes hard to view due to guard-band noises, and the like.

Figure 2:
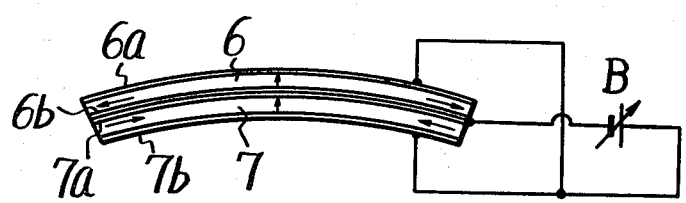
FIG. 2 is a schematic diagram of a bi-morph leaf which may be used with the present invention.

Referring to FIG. 2, it will be seen that a bi-morph leaf consists of a first leaf or piezoelectric element 6 with metal electrodes 6a, 6b formed on its opposed surfaces by plating or the like and a second leaf or piezoelectric element 7 with metal electrodes 7a, 7b formed on its opposed surfaces. The surfaces of metal electrodes 6b and 7a are bonded together. Leaves 6 and 7 of piezoelectric material are shown to be poled parallel to the directions of their thickness. When an electric field is applied to the leaves 6 and 7 in the same direction as their poling direction, the leaves 6 and 7 are longitudinally contracted due to the piezoelectric effect. When an electric field is applied to the leaves in the direction opposite to their poling direction, the leaves 6 and 7 are longitudinally expanded. If the electrodes of leaves 6 and 7 are connected to a voltage source B, as shown in FIG. 2, to apply a voltage to leaf 6 from electrode 6a to electrode 6b and a voltage to leaf 7 from the electrode 7b to electrode 7a, the bi-morph leaf is deflected or displaced by the resulting electric fields substantially in proportion to the magnitude of the applied voltage. If the directions of the voltages applied to the bi-morph leaf are reversed, the direction of displacement thereof is also reversed.

Figure 3A:
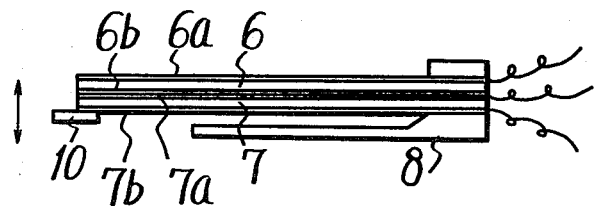
FIGS. 3A and 3B are respectively a side view and a top view of a bi-morph leaf having a magnetic head secured at one of its ends and having its other end fixed.
Figure 3B:
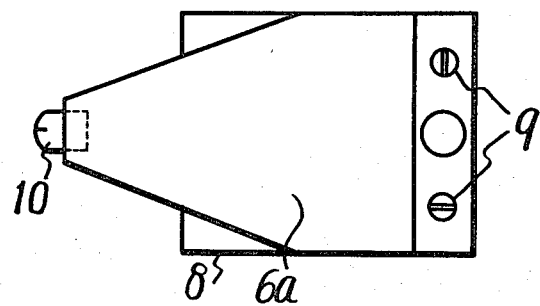

Referring now to FIGS. 3A and 3B, it will be seen that, when one end of a bi-morph leaf is fixed to a base 8 by, for example, screws 9, and a magnetic head 10 is secured to the other or free end of the bi-morph leaf, a voltage applied across the electrodes of the bi-morph leaf in the manner described above will cause magnetic head 10 to be displaced in the direction perpendicular to the scanning direction as indicated by the two-headed arrow on FIG. 3A.

Figure 4:
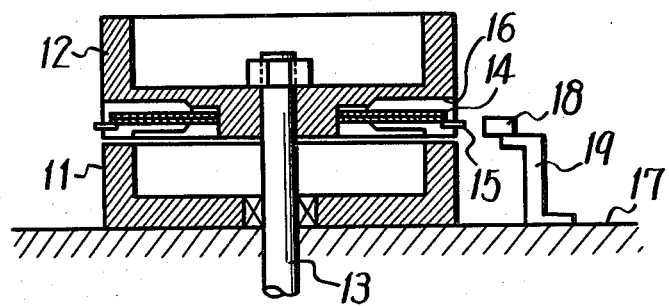
FIG. 4 is a cross-sectional view of a rotary head drum and a head height sensor according to the present invention.

Referring now to FIG. 4, there is shown a rotary head drum assembly for use with a VTR according to the present invention including a fixed lower drum 11, a rotary upper drum 12 and a rotating shaft 13 which may be driven by a motor (not shown) to rotate upper drum 12 at any convenient frequency such as, for example, 30 Hz.

One end of bi-morph leaf 14 is secured to a lower surface of rotary upper drum 12, and a magnetic head 15 is fixed to the other or free end of bi-morph leaf 14. A recess 16 in the lower surfaces of rotary upper drum 12, opposing the free end of bi-morph leaf 14 where magnetic head 15 is secured, provides clearance for up-and-down motion of magnetic head 15. As is conventional, and as shown on FIG. 4, a second magnetic head on a bi-morph leaf may be disposed 180° away from head 15 and bi-morph leaf 14.

During slow, fast, or still reproduction, a sawtooth or trapezoidal waveform may be suitably applied to bi-morph leaf 14 to displace scanning head 15 so that its scanning locus is deflected from the loci indicated by arrows 3 or 4 (FIG. 1) into alignment with recorded track T.

In accordance with this invention, a signal transducing device 18 detects the height of head 15 relative to a reference height, such as the surface of a chassis 17. The signal transducing device is preferably a magnetic head 18 which is mounted on a post or base 19 affixed to chassis 17 facing the peripheral surface of magnetic head 15 as the latter rotates with upper drum 12.

A signal is supplied to one of the heads 15 or 18 and the other of such heads detects leakage magnetic flux from the first-mentioned head. The characteristics of the detected signal may be employed to determine the height of magnetic head 15, as will be explained hereinafter. In a preferred embodiment, rotary scanning head 15 receives a carrier signal and fixed magnetic head 18 detects the leakage magnetic flux as scanning head 15 is rotated therepast.

Figure 5:
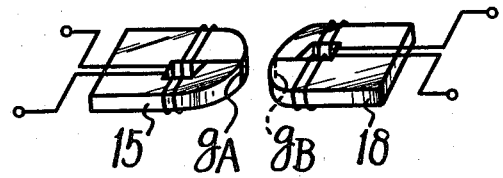
FIG. 5 is a perspective view showing a signal recording and reproducing magnetic head and a height detecting magnetic head having their gaps parallel to each other according to one embodiment of the invention.

Referring now to FIG. 5, it will be seen that a gap gA of head 15 may be disposed substantially parallel to a gap gB of head 18. Head 15 is excited by a signal such as, for example, a carrier of 4 MH$_z$. Head 18 receives the carrier signal with an amplitude and phase which varies in response to the relationship of gaps gA and gB. The output characteristics of head 18 in response to movement of head 15 relative to head 18 are shown in FIGS. 6A, 6B and 6C.

Figure 6A:
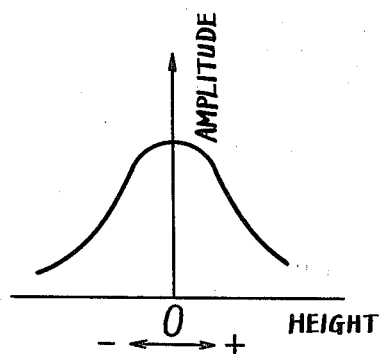
FIG. 6A is a graph of an output amplitude of the height detecting magnetic head of FIG. 5 versus head height.
Figure 6B:
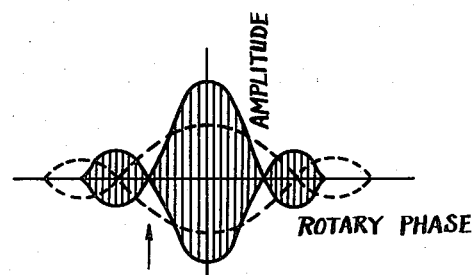
FIG. 6B is a graph of an output amplitude of the height detecting magnetic head of FIG. 5 versus the rotary phase of the signal magnetic head for two head heights.
Figure 6C:
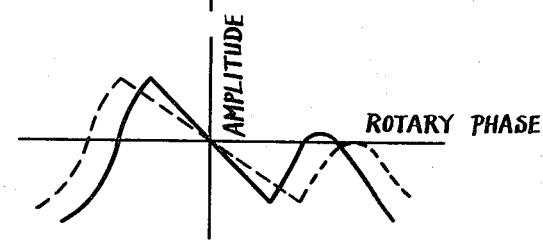
FIG. 6C is a graph showing an integrated output of a phase detector responsive to the signals of FIG. 6B.

FIG. 6A shows the amplitude variation of the output from head 18 when head 15 is displaced up and down with respect to head 18. The output amplitude is maximum when heads 15 and 18 are at the same height, and decreases as their heights relative to chassis 17 differ. FIG. 6B shows the amplitude of the output from head 18 relative to the rotary phase of head 15 as head 15 is rotated therepast by rotary drum 12. The vertical reference line coinciding with the center maximum occurs when gaps gA and gB are aligned in the rotational direction. The solid line on FIG. 6B shows the output when heads 15 and 18 are at the same height and the dotted line shows the output when heads 15 and 18 are relatively displaced in height. The phase of the signal received in the center portion is inverted relative to that received in the side portions. If the signal received by head 18 is phase detected with the carrier supplied to head 15, this phase reversal can be detected and used. If the output from the phase detector is integrated, an output waveform shown in FIG. 6C is obtained. In FIG. 6C, the solid line represents the case where heads 15 and 18 are at the same height and the dotted line represents the case where head 15 is displaced up or down from head 18.

When head 15 is displaced up and down, only the output amplitude is changed. The output signal does not contain information from which the direction of displacement of head 15 can be determined.

Figure 7:
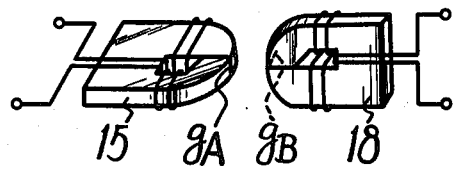
FIG. 7 is a perspective view showing a signal recording and reproducing magnetic head and a height detecting magnetic head having their gaps perpendicular to each other according to another embodiment of the invention.
Figure 8A:
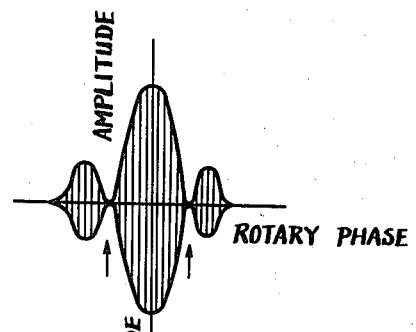
FIGS. 8A–8C are graphs showing outputs of the height detecting magnetic head shown in FIG. 7 for varying heights of the signal recording and reproducing magnetic head.
Figure 8B:
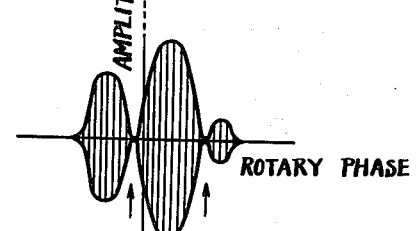
Figure 8C:
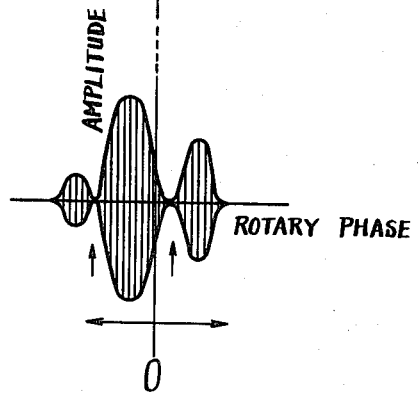

Referring now to FIG. 7, head 18 is there shown turned through 90° from its position on FIG. 5 so that gaps gA and gB of heads 15 and 18 are at right angles to each other. When rotary head 15 is moved past head 18, the output of head 18 varies as shown in FIGS. 8A–8C. In FIG. 8A, heads 15 and 18 are at the same height, and the center and side lobes are substantially symmetrical about a zero line. In FIG. 8B, head 15 is displaced, for example, downward, relative to head 18, and the center and side lobes are displaced to the right and the amplitudes of the side lobes are unequal with the left side lobe being larger than the right side lobe. In FIG. 8C, head 15 is displaced upward relative to head 18, and the center and side lobes are displaced to the left and the side lobes are unequal in the opposite sense to the showing in FIG. 8B. The abscissa in each of FIGS. 8A–8C represents the rotary phase of head 15 with respect to head 18.

As is apparent from FIGS. 8A–8C, the output of head 18 contains information from which a direction of displacement of head 15 can be determined.

Figure 9:
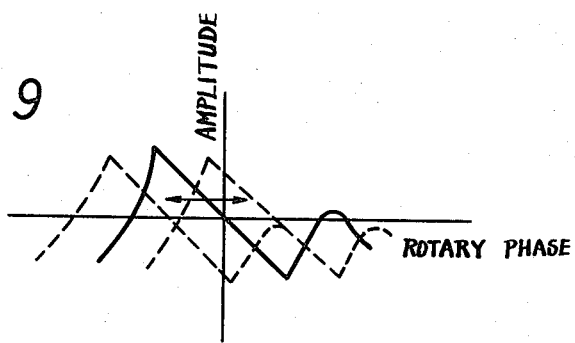
FIG. 9 is a graph showing the relationship between the rotary phase of the signal head and the integrated output from a phase detector responsive to the outputs of FIGS. 8A–8C.

A phase detector receiving the output from head 18 produces the integrated outputs shown in FIG. 9. The solid line corresponds to the height-aligned condition of FIG. 8A and the dashed lines correspond to height-misaligned conditions of FIGS. 8B and 8C. If a sampling pulse is provided for indicating zero rotary phase, an error signal for control of head height can be obtained.

Figure 10A:
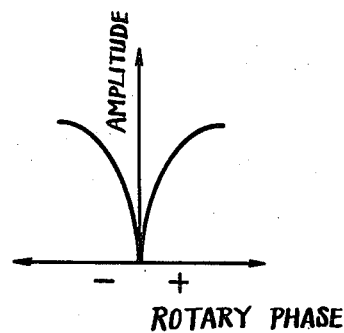
FIGS. 10A and 10B are respectively graphs showing the amplitude and phase of a portion of the signals in FIGS. 6B and 8A–8C relative to the rotary phase of the signal recording and reproducing magnetic head.
Figure 10B:
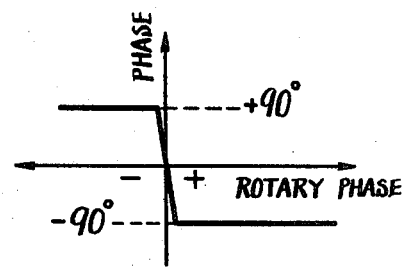

The arrows on FIGS. 6B and 8A–8C indicate points in the rotational phase of head 15 at which the amplitude and phase of the signal from head 18 pass through zero as shown in FIGS. 10A and 10B. The zero crossing of the phase in FIG. 10B is much sharper when the head gaps are at right angles to each other, as shown in FIG. 7 than when the head gaps are parallel, as shown in FIG. 5.

Figure 11:
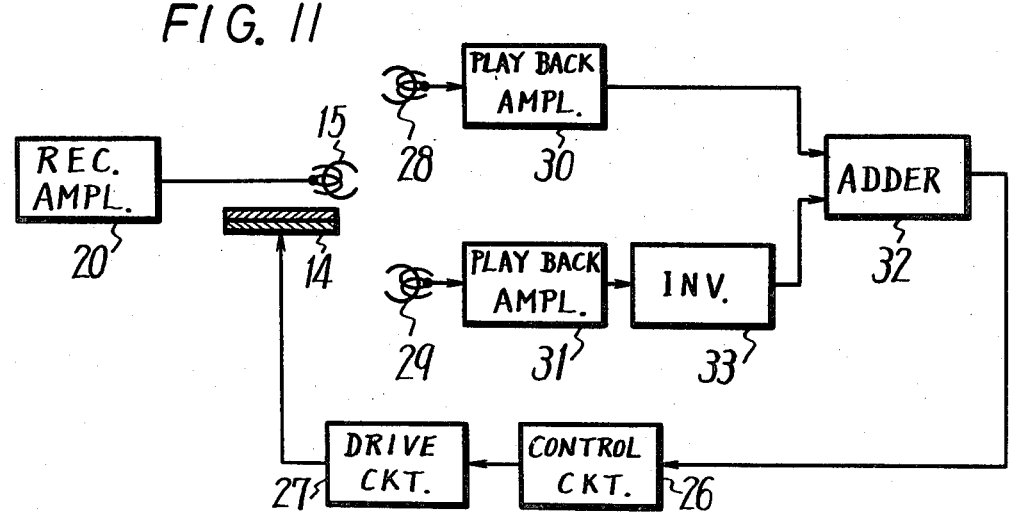
FIG. 11 is a block diagram of a head height control apparatus according to another embodiment of the present invention, and which employs the amplitudes of the outputs of a pair of height detecting magnetic heads.

Referring now to FIG. 11, an embodiment of the invention is there shown to include a pair of detecting heads 28 and 29 disposed at fixed positions equally spaced above and below the normal head height H$_0$, but still within the influence of rotating head 15. The amplitudes of the detected outputs of heads 28 and 29 are utilized to produce a control signal for bi-morph leaf 14. When head 15 is rotated at normal height H$_0$, the outputs of heads 28 and 29 are equal. When head 15 is above or below normal height H$_0$, the output of one of heads 28 and 29 decreases while the output of the other head increases.

The output of head 28 is supplied through a playback amplifier 30 to one of the input terminals of an adding circuit 32. The output of head 29 is supplied through a playback amplifier 31 and an inverter 33 to the other input terminal of adding circuit 32. When head 15 is positioned at the height H$_0$, the two inputs of adding circuit 32 are equal and opposite and adding circuit 32 produces zero output. When head 15 is displaced to be above or below height H$_0$, the two inputs to adding circuit 32 are no longer equal and opposite and thus adding circuit 32 produces an output which has a polarity in accordance with the direction of the head displacement and a level in accordance with the amount of such displacement. The output from adding circuit 32 is supplied to control circuit 26 which produces a control signal for application through drive circuit 27 to a bi-morph leaf 14 to displace or maintain head 15 at its normal height H$_0$.

Two positions P$_S$ exist in the embodiment of FIG. 7, that is, when the heads 15 and 18 have their gaps arranged at right angles, where the phase of the detected output of single detecting head 18 is abruptly inverted as head 15 moves therepast. Such positions P$_S$ are shown in FIGS. 8A–8C by arrows. When the relative heights of heads 15 and 18 change, the positions P$_S$ where the phase of the detected output is abruptly inverted move in the rotating direction of head 15 as shown by dashed and dash-dot lines in FIG. 12. The height of head 15 can be detected by sensing a position P$_S$ at which the abrupt phase inversion takes place, for example, as in the embodiment shown on FIG. 13.

In the embodiment of FIG. 13, a single head 18 having a horizontal gap is fixed at a normal height above chassis 17 (not shown). Magnetic head 15 having its gap at right angles to the gap of head 18 is rotated at a constant speed past head 18. A carrier signal from an oscillator 34 is supplied through a recording amplifier 35 to head 15. Head 18 detects the magnetic flux from head 15 and supplies its detected output through a playback amplifier 36 to a phase detector circuit 37. The carrier signal from oscillator 34 is also supplied to phase detector circuit 37. Phase detector circuit 37 phase detects the output of playback amplifier 36 to produce a detected output $P_A$ (FIG. 14A). The detected output $P_A$ from phase detector circuit 37 is fed to an integration circuit 38 which in turn produces a trapezoidal waveform $P_B$ (FIG. 14B). The trapezoidal waveform $P_B$ is fed to a sample-and-hold circuit 39. A pulse generator 40, which may be a fixed magnetic head past which is rotated the pole of a permanent magnet (not shown) located at a predetermined angular position on the head drum with respect to head 15, generates a pulse $P_G$ (FIG. 14C) at a predetermined angular position of head 15 relative to fixed head 18. The pulse $P_G$ triggers a monostable multivibrator 41 to produce a pulse signal $S_D$ (FIG. 14D) having a pulse width of $\tau$ which is fed to a sampling pulse generator circuit 42. At the end of pulse $S_D$, sampling pulse generator 42 generates a sampling pulse $S_E$ (FIG. 14E). The sampling pulse $S_E$ is fed to sample-and-hold circuit 39. Sample-and-hold circuit 39 samples the voltage attained by the inclined or slant portion of the trapezoidal waveform $P_B$ from integration circuit 38 and holds the sampled value for the remainder of a revolution of head 15.

Figure 15:
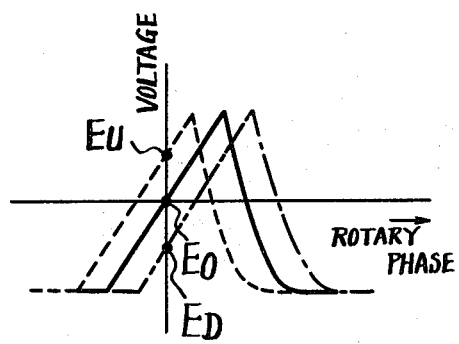
FIG. 15 is a graph of the relationship between the time of occurrence of the trapezoidal waveform shown in FIG. 14B and the height of the signal magnetic head.

The pulse width $\tau$ of monostable multivibrator 41 is selected such that, when rotated head 15 is at its normal head height $H_0$, trapezoidal waveform $P_B$ is sampled at the center of its inclined portion by the sampling pulse $S_E$. Accordingly, if head 15 is positioned at the normal head height $H_0$, the value of an output $S_F$ from sample-and-hold circuit 39 is $E_0$ (FIG. 15).

As previously described, the rotational position at which output $P_A$ from phase detector circuit 37 abruptly changes varies when the height of head 15 is varied. Thus, the comparison trapezoidal waveform $P_B$ is advanced or retarded (FIG. 15) relative to the sampling pulse $S_E$. The solid line in FIG. 15 indicates the position of $P_B$ relative to the sampling pulse $S_E$ when head 15 is positioned at the normal head height $H_0$. When head 15 is displaced upward from the height $H_0$, the comparison trapezoidal waveform $P_B$ is advanced in time as shown by the broken line in FIG. 15 and is at a relatively higher value $E_u$ upon being sampled. Conversely, when head 15 is displaced downward from the height $H_0$, the trapezoidal waveform $P_B$ is retarded in time, as shown by the one-dot chain line in FIG. 15, and is at a relatively lower value $E_D$ upon being sampled.

Figure 16:
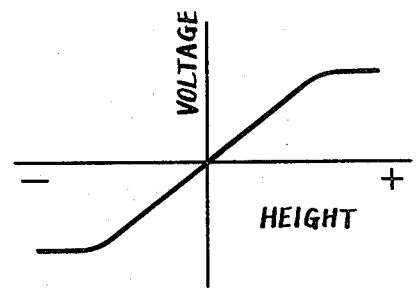
FIG. 16 is a graph of the relationship between a sample-and-hold voltage and the height of the signal magnetic head.

The relationship between the sample-and-hold voltage and the height to which head 15 is displaced is shown in FIG. 16, from which it will be clear that the sample-and-hold voltage varies linearly with the height difference between rotary magnetic head 15 and fixed head 18.

The voltage from sample-and-hold circuit 39 (FIG. 13) is supplied to a control circuit 43 which supplies its output through a drive circuit 44 to bi-morph leaf 14 in order to deflect bi-morph leaf 14 and thus displace head 15 to the normal head height $H_0$.

Although oscillator 34 is included as a signal source for head 15 in FIG. 13, such a signal source may not be necessary. The signal normally fed to head 15 during recording is an FM signal. In a two-headed system, if the FM signal to be recorded is continuously fed to both heads, this signal may be detected from the inactive head 15 and employed for head height control in the manner described.

Figure 17:
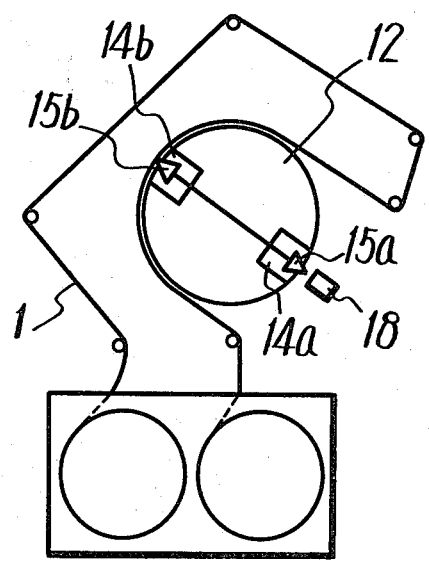
FIG. 17 is a top view of a portion of a VTR employing the present invention.

A 2-head cassette VTR, such as is shown in FIG. 17, may employ the present invention. In such case, magnetic video recording and reproducing heads 15a and 15b on bi-morph leaves 14a and 14b alternately contact tape 1. Tape 1 is wrapped 180° about rotary upper drum 12 leaving a substantial arc of rotary upper drum 12 out of contact with tape 1. Height detecting magnetic head 18 is located adjacent the path of magnetic heads 15a and 15b in the portion of their rotation which is free of tape 1. Thus, head 18 is influenced by magnetic flux from each of heads 15a and 15b alternately as such heads are free of tape 1.

Having described specific embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A head height control apparatus for at least one magnetic head movable in a closed path during selective operations in recording and playback modes and being mounted on an electrically deflectable element for displacement in a direction transversely of of said path, comprising:
   sensing means periodically disposed in facing relation to said head for achieving a transducing relation therebetween and being operative in said recording mode of the head for producing at least one detected signal in response to said transducing relation, which signal contains information in respect to a magnitude and a direction of deviation of any deviation of said at least one magnetic head from a predetermined height in said direction transversely of the path; and
   control means responsive to said at least one detected signal for electrically deflecting and electrically deflectable element in opposition to said direction of deviation and in an amount tending to compensate for said deviation and thereby maintain said at least one magnetic head at said predetermined height when in said recording mode.

2. A head height control apparatus according to claim 1; wherein said sensing means includes second and third magnetic heads at locations along said path which are aligned in said direction transversely of the path, said second fixed magnetic head being disposed a predetermined increment above said predetermined height and said third fixed magnetic head being disposed an equal predetermined increment below said predetermined height, said second and third fixed magnetic heads being operative to produce first and second output signals which are equal when said at least one magnetic head is at said predetermined height and which are unequal when said at least one magnetic head is above and below said predetermined height.

3. A head height control apparatus according to claim 2; wherein said control means is responsive to an amplitude difference in said first and second output signals.

4. A head height control apparatus according to claim 2; wherein said control means includes means for inverting one of said first and second output signals to produce an inverted output signal, and an adder for adding said inverted output signal to the other of said first and second output signals.

5. A head height control apparatus according to claim 1; wherein said sensing means includes at least a second magnetic head disposed adjacent said path in a fixed height relationship to said predetermined height so as to be in said transducing relation with said at least one magnetic head in each circuit by the latter of said closed path and further includes means for exciting one of said at least one and said second magnetic heads with a carrier signal, the other of said magnetic heads being operative to detect said carrier signal.

6. A head height control apparatus according to claim 1; wherein said control means is responsive to an amplitude of said at least one detected signal.

7. A head height control apparatus according to claim 1; wherein said sensing means includes at least a second magnetic head fixed adjacent said path at said predetermined height and said at least one detected signal is produced by leakage flux from said at least one magnetic head to said second magnetic head on each circuit of said closed path by said one magnetic head.

8. A head height control apparatus according to claim 1; wherein said control means is responsive to a phase of said at least one detected signal.

9. A head height control apparatus according to claim 1; wherein said at least one head and said electrically deflectable element are mounted on a rotating body which is rotatable at a rotation rate related to a television field frequency.

10. A head height control apparatus according to claim 1; wherein said at least one magnetic head has a first gap, said sensing means includes a second magnetic head which is in a fixed position adjacent said path so as to be in said transducing relation with said at least one magnetic head in each circuit of said closed path by said at least one magnetic head, said second magnetic head having a second gap, and said first and second gaps being at right angles to each other.

11. A head height control apparatus for a video tape recorder of the type having a drum at least a portion of which is rotatable about a central axis, at least a first electrically deflectable element having a first end affixed to said portion of the drum and a second end which is free, and a magnetic head affixed to said second end for movement therewith in a circular path and for displacement in a direction transversely of said path upon deflection of said element, said magnetic head having a normal height in said direction, comprising:

at least a second magnetic head at a fixed location adjacent said path which has a predetermined relationship to said normal height and at which said second magnetic head is periodically in transducing relation with the first mentioned magnetic head on each circuit by the latter of said path;

means connected with said second magnetic head for producing a detected signal in response to each periodic transducing relationship of said first magnetic head with said second magnetic head, said detected signal containing information about at least a direction of any deviation of said first magnetic head from said normal height; and for applying a control signal to said electrically deflectable element which is effective to displace said first magnetic head toward said normal height and thereby eliminate said deviation.

12. A head height control apparatus according to claim 11; wherein said detected signal also contains information about a magnitude of said deviation.

13. A head height control apparatus according to claim 11; in which said first magnetic head is selectively operable in recording and playback modes, said electrically deflectable element is adapted, in said playback mode, to receive a tracking signal by which said first magnetic head is made to accurately scan along tracks in which video signals have been recorded on a tape guided by said drum, and said control signal is applied to said electrically deflectable element in said recording mode for ensuring a uniform pitch between said tracks.

* * * * *